United States Patent [19]

Mack

[11] 4,157,803
[45] Jun. 12, 1979

[54] FISHING ROD HOLDER

[76] Inventor: Raymond S. Mack, Rte. 1, Box 53, Effingham, S.C. 29541

[21] Appl. No.: 761,289

[22] Filed: Jan. 21, 1977

[51] Int. Cl.² ........................................... A01K 97/10
[52] U.S. Cl. ................................. 248/512; 211/60 R; 248/538; 43/21.2
[58] Field of Search ................. 43/21.2; 248/512, 538, 248/535, 513, 511, 534; 211/105.2, 105.3, 105.4, 105.5, 105.6, 60 R, 124; 9/1.7, 7, 5, 1.1

[56] References Cited

U.S. PATENT DOCUMENTS

| 1,520,543 | 12/1924 | Meachen | 9/1.7 X |
|---|---|---|---|
| 1,857,774 | 5/1932 | Wickman | 248/513 X |
| 2,271,616 | 2/1942 | Beale | 248/513 |
| 2,448,752 | 9/1948 | Wagner | 248/512 |
| 2,452,116 | 10/1948 | Felton | 248/535 X |
| 2,661,918 | 12/1953 | Riggs | 248/534 X |
| 2,852,218 | 9/1958 | Stires | 248/534 X |
| 3,006,588 | 10/1961 | Lemi | 248/512 |
| 3,084,804 | 4/1963 | Belsinger | 211/124 |
| 3,628,204 | 12/1971 | Hoffman, Jr. | 9/1.1 |
| 4,008,874 | 2/1977 | Conway, Jr. | 248/534 |

FOREIGN PATENT DOCUMENTS 671289  10/1963  Canada ................................. 211/105.3

Primary Examiner—Clifford D. Crowder
Attorney, Agent, or Firm—C. Gordon McBride

[57] ABSTRACT

A fishing rod holder device for a boat comprising a body which extends from gunwale to gunwale of the boat and has legs for removably mounting said body to the gunwales and including a plurality of fishing rod holders angularly attached to said body with clamping means in the rod holders for selectively securing the fishing rods in place.

3 Claims, 7 Drawing Figures

FISHING ROD HOLDER

BACKGROUND OF THE INVENTION

It has been known to utilize various holding devices for fishing rods to relieve the fisherman from holding the rod at all times. Generally such holders are of simple construction and utilize a clamp device for attachment to the side of a boat or on the railing of a pier. However, such devices are adapted for holding only one fishing rod and are not designed to permit a fishing rod to be placed in the holder and the boat moved without some disadvantage. For example, the rod may become dislodged from the previously known holders or because the holders are similarly situated on the gunwales of the boat the lines tend to become entangled during movement.

The present invention avoids these disadvantages by providing a device for holding fishing rods which extends from gunwale to gunwale of the boat and which may be rapidly attached or removed depending upon the wishes of the fisherman.

DESCRIPTION

Referring now to the drawings wherein like numerals refer to the same or corresponding parts and where:

Figure 1:
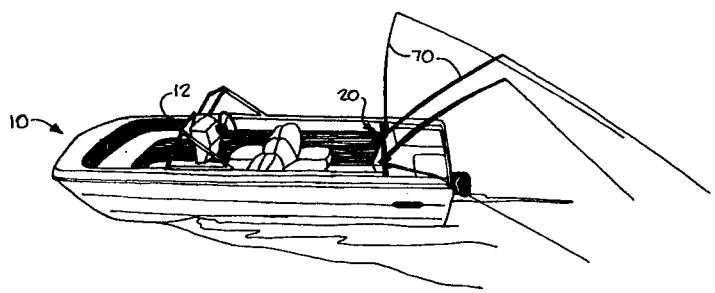
FIG. 1 is an isometric view of a boat incorporating the invention.

FIG. 1 shows boat 10 having gunwales 12 extending along the upper edges thereof in the normal configuration of boat construction. Rod holder 20 is shown as extending from one gunwale 12 to the other gunwale 12. As seen more clearly in FIGS. 2 through 4, rod holder 20 includes longitudinal body member number 22 having legs 24 extending downwardly therefrom. Body 22 is shown to include centerline 26 which divides body 22 into right section 28 and left section 30.

Figure 7:
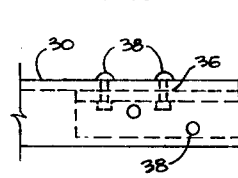

As best seen in FIG. 7 extension arm or adjustment 32 is adapted for insertion between the respective sections 28 and 30 of body 22 to provide for extension of rod holder 20 in accordance with varying widths of boats between the gunwales.

Extension arm 32 may be attached to sections 28 and 30 by utilization of apertures 34 and 36 which are coincidingly arranged for attachment of extension arm 32 to body 22. Bolts 38 extend through the respectively coinciding apertures 34 and 36 to accomplish the attachment of extension arm 32 to sections 28 and 30 of body 22.

Fishing rod holders 40 are welded to body 22 as at 42 and have a threaded opening or aperture 44 with nut 46 welded thereabout. Bolt 48 extends through the threaded aperture of nut 46 and utilizes wing nut 50 for providing clamp 52 for fishing rod handle 72.

Figure 3:
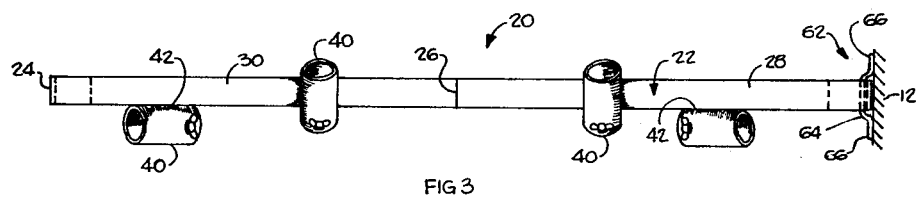
FIG. 3 is a top view of the rod holder of the instant invention.
Figure 2:
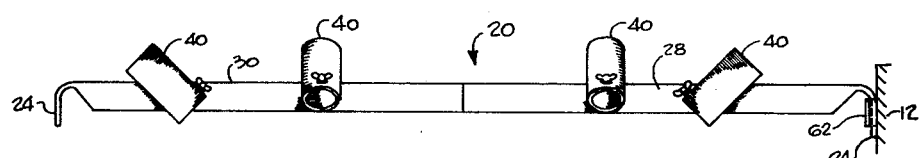
FIG. 2 is a side elevational view of the instant invention.
Figure 4:
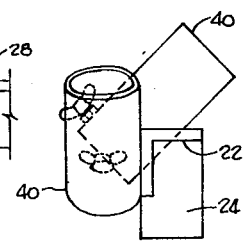
FIG. 4 is an end elevational view of the instant invention.

As best seen in FIGS. 2 and 3 body 22 has legs 24 which fit within brackets 62 that are mounted on gunwales 12 of boat 10. Brackets 62 have U-shaped body 64 with flanges 66 which are attached to gunwales 12 by bolts, screws or other conventional means (not shown).

It is noted that holders 40 are generally attached to body 22 at approximately a 45 degree angle to the horizontal and are mounted such that the two interior holders are adapted for holding rods extending over the stern or aft end of the boat and the two exterior holders 40 are arranged to support fishing rods which extend outwardly from the sides of boat 10.

Figure 5:
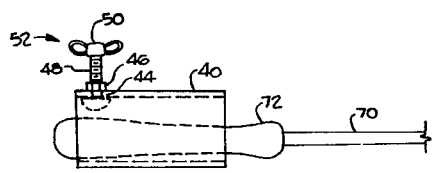
FIG. 5 is an enlarged side view of a portion of the rod holder of the invention.
Figure 6:
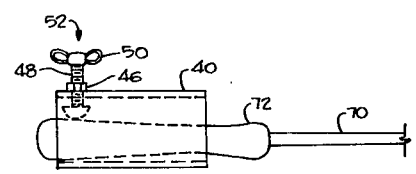
FIG. 6 is an enlarged side view of the holder of the invention in a modified position from that of FIG. 5; and, FIG. 7 shows an alternative embodiment of the invention adapted for a wider boat.

Fishing rods 70 having handles 72 are easily and rapidly inserted into holders 40. Rotational movement of wing nut 50 which is rigidly secured to bolt 48 permits bolt 48 to be forced inwardly to hold handle 72 of fishing rod 70 in a secure position during movement of boat 10. Under normal fishing circumstances bolt 48 would remain in the withdrawn position shown in FIG. 5 to permit rapid removal of rod 70 should a fish be caught thereon.

Thus it is readily seen that the instant invention provides a novel and unique device for attachment to a boat which permits the operator of the boat to move from one location to another without stowing the fishing gear and without having to remove the fishing rods and stow them in the boat. Furthermore, the fisherman does not have the inconvenience or dangerous situation of fishing rods laying in the bottom of a boat which might cause injury to the fisherman and passengers or a breaking of the equipment. The device is simple for mounting onto a boat and requires no exceptional space for storage when not in use and yet can be rapidly installed when desired.

What is claimed is:

1. A fishing rod holder for attachment to the gunwales of a boat comprising an elongated body adjustable in length and configured to extend between the gunwales of a boat, leg means at each end of said body, support means affixed to each gunwale of said boat and configured to removably receive said leg means and support said elongated body, a plurality of rod holders affixed to said elongated body, each of said holders being dimensioned to receive and support a fishing rod therewithin and clamping means selectively operable to clampingly secure the handle of a fishing rod within said holder.

2. The fishing rod holder of claim 1 wherein said clamping means includes bolt and nut members for locking the fishing rod handles in place in said holder.

3. The fishing rod holder of claim 1 including an extension arm and means for securing said extension arm to said body, said extension arm being attached to selected portions of said body to adapt said holder to boats of differing width.

* * * * *